(12) United States Patent
Mosqueda Mejia et al.

(10) Patent No.: US 10,303,341 B2
(45) Date of Patent: May 28, 2019

(54) MODIFYING SCREEN CONTENT BASED ON GAZE TRACKING AND USER DISTANCE FROM THE SCREEN

(71) Applicant: International Business Machines Corporation, Armonk, NY (US)

(72) Inventors: Jose R Mosqueda Mejia, Puruandiro (MX); Humberto Orozco Cervantes, Tonalá (MX)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/164,707

(22) Filed: May 25, 2016

(65) Prior Publication Data

US 2017/0344108 A1 Nov. 30, 2017

(51) Int. Cl.
*G06F 3/0484* (2013.01)
*G06F 3/01* (2006.01)
(Continued)

(52) U.S. Cl.
CPC ............ *G06F 3/0484* (2013.01); *G06F 3/013* (2013.01); *G06F 3/04842* (2013.01);
(Continued)

(58) Field of Classification Search
CPC ........ G06F 3/013; G06F 3/048; G06F 3/0481; G06F 3/0484; G06F 3/04845; G06F 2203/04806; G06F 2203/04808; G06F 3/04842; G09G 2320/0261; G09G 2320/06; G09G 2340/045; G01C 3/08; G06T 5/00; G06K 9/00281; G06K 9/00604
See application file for complete search history.

(56) References Cited

U.S. PATENT DOCUMENTS

| 8,717,363 | B2* | 5/2014 | Contractor ............. G06F 3/013 345/419 |
| 8,754,831 | B2 | 6/2014 | Kollin et al. |

(Continued)

FOREIGN PATENT DOCUMENTS

| EP | 2762997 A2 | 8/2014 |
| WO | 2014197409 A1 | 12/2014 |

OTHER PUBLICATIONS

Gray, Ricahrd. "Never Struggle to Read Subtitles Again! Samsung Patents Eye-Tracking Technology to Zoom in if It Sees You Squinting at the TV". Retrieved fom <http://www.dailymail.co.uk/sciencetech/article-3213143/Never-struggle-read-subtitles-Samsung-patents-eye-tracking-technology-ZOOM-sees-squinting-TV.html> on May 24, 2016. 1 page.

(Continued)

*Primary Examiner* — Jwalant Amin
(74) *Attorney, Agent, or Firm* — Patterson + Sheridan, LLP (57) ABSTRACT

Systems, methods, and computer program products to perform an operation to enhance readability of on-screen objects, the operation comprising determining a distance of a user from a screen displaying a plurality of objects, monitoring, by a gaze module, a gaze of the user, determining a focal point of the gaze of the user relative to the screen, and modifying, based on the distance and the focal point, one or more attributes of a first object corresponding to the focal point, wherein the one or more attributes comprise at least one of a size of the first object and a zoom factor applied to the first object.

20 Claims, 7 Drawing Sheets

(51) Int. Cl.
*G06T 5/00* (2006.01)
*G01C 3/08* (2006.01)
*G06F 3/0481* (2013.01)
*G06F 3/048* (2013.01)
*G06K 9/00* (2006.01)

(52) U.S. Cl.
CPC .......... *G06F 3/04845* (2013.01); *G01C 3/08* (2013.01); *G06F 3/048* (2013.01); *G06F 3/0481* (2013.01); *G06F 2203/04806* (2013.01); *G06K 9/00281* (2013.01); *G06K 9/00604* (2013.01); *G06T 5/00* (2013.01); *G09G 2320/0261* (2013.01); *G09G 2320/06* (2013.01); *G09G 2340/045* (2013.01)

(56) References Cited

U.S. PATENT DOCUMENTS

| | | | |
|---|---|---|---|
| 9,508,005 B2* | 11/2016 | Peng | G06T 7/73 |
| 2002/0105482 A1 | 8/2002 | Lemelson et al. | |
| 2007/0279591 A1* | 12/2007 | Wezowski | G06F 3/013 |
| | | | 351/208 |
| 2011/0001763 A1* | 1/2011 | Murakami | G09G 5/14 |
| | | | 345/661 |
| 2012/0036433 A1* | 2/2012 | Zimmer | G06T 15/20 |
| | | | 715/702 |
| 2013/0342309 A1* | 12/2013 | Jiang | H04N 21/4415 |
| | | | 340/3.1 |
| 2015/0221064 A1 | 8/2015 | Thomas et al. | |
| 2015/0309565 A1 | 10/2015 | Beri et al. | |

OTHER PUBLICATIONS

Freedom Scientific, "Low Vision Solutions: MAGic". Retrieved from <http://www.freedomscientific.com/Products/LowVision/MAGic> on May 25, 2016. 2 pages.

AiSQUARED, "ZoomText Family—US English". Retrieved from <http://www.aisquared.com/support/more/documentation/> on May 25, 2016. 2 pages.

Rahman et al., "Person to Camera Distance Measurement Based on Eye-Distance," 2009 Third International Conference on Multimedia and Ubiquitous Engineering, pp. 137-141.

* cited by examiner

MODIFYING SCREEN CONTENT BASED ON GAZE TRACKING AND USER DISTANCE FROM THE SCREEN

BACKGROUND

The present disclosure relates to assistive technology, and more specifically, to modifying screen content based on gaze tracking and user distance from the screen.

People have different levels of vision, leading to mixed results when viewing content on a screen. When vision is poor, users might be unable to read text or clearly view other objects presented on the screen. Conventional assistive technologies may expand the entire screen (akin to lowering the screen resolution). However, doing so makes it difficult for users to navigate through the presented content, as the overall structure of the screen is lost when the entire screen is expanded.

SUMMARY

In one embodiment, a method comprises determining a distance of a user from a screen displaying a plurality of objects, monitoring, by a gaze module, a gaze of the user, determining a focal point of the gaze of the user relative to the screen, and modifying, based on the distance and the focal point, one or more attributes of a first object corresponding to the focal point, wherein the one or more attributes comprise at least one of a size of the first object and a zoom factor applied to the first object.

In another embodiment, a system comprises a processor and a memory containing a program, which when executed by the processor, performs an operation comprising determining a distance of a user from a screen displaying a plurality of objects, monitoring, by a gaze module, a gaze of the user, determining a focal point of the gaze of the user relative to the screen, and modifying, based on the distance and the focal point, one or more attributes of a first object corresponding to the focal point, wherein the one or more attributes comprise at least one of a size of the first object and a zoom factor applied to the first object.

In yet another embodiment, a computer program product comprises a computer-readable storage medium storing instructions which when executed by a processor performs an operation comprising determining a distance of a user from a screen displaying a plurality of objects, monitoring, by a gaze module, a gaze of the user, determining a focal point of the gaze of the user relative to the screen, and modifying, based on the distance and the focal point, one or more attributes of a first object corresponding to the focal point, wherein the one or more attributes comprise at least one of a size of the first object and a zoom factor applied to the first object.

DETAILED DESCRIPTION

Embodiments disclosed herein provide assistive technology to users by modifying on-screen content based on the user's distance to the screen and the content that is the subject of the user's gaze. Generally, modification settings may be created for each of a plurality of users as part of a calibration process. During the calibration process, the user's vision may be assessed, and corresponding user-specific modification settings may be defined. In one embodiment, those modification settings are stored in respective user profiles. When a user subsequently views content on the screen of a computing device, embodiments disclosed herein may determine the user's distance from the screen, and an area of the screen (e.g., on-screen content) that is the subject of the user's gaze. Embodiments disclosed herein may then modify the content that is the subject of the user's gaze based on the user's distance to the screen and on the modification settings specific to that user. For example, if the user is focusing on a block of text, the computing system may highlight the text, and increase the size of the text based on the user's distance to the screen. As another example, if the user's gaze is focused on a first image, embodiments disclosed herein may magnify (e.g., apply a zoom or scaling factor to) the first image based on the user's distance to the screen. Similarly, if the user's gaze shifts to a second image, the first image may be re-scaled to its original size, while the second image may be magnified based on the user's distance to the screen. Furthermore, the modifications provided herein may be limited to those specific items of on-screen content that are subject of the user's gaze. Doing so preserves the state of the rest of the on-screen content, facilitating browsing and consumption of all on-screen content.

Figure 1A:
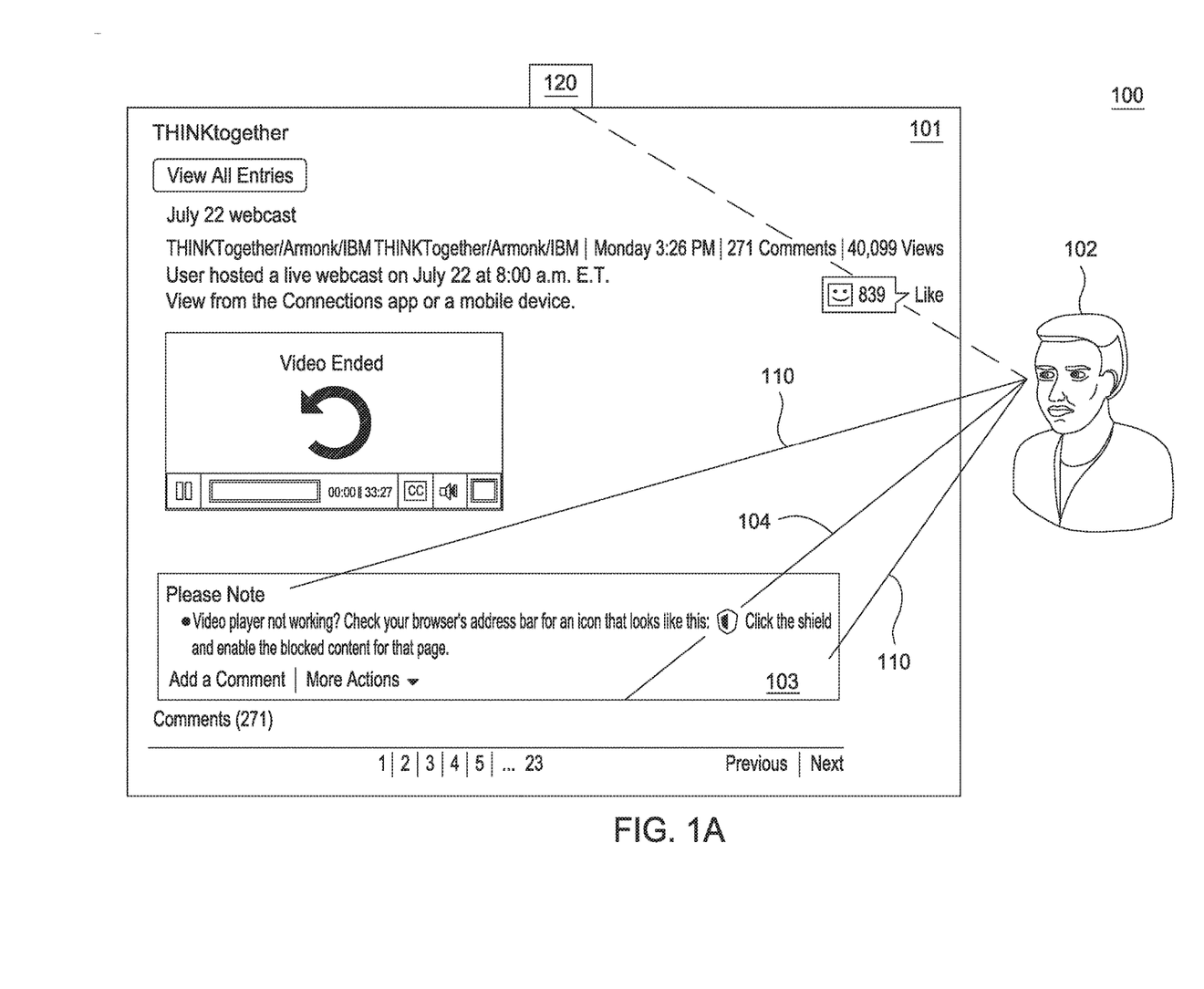
FIGS. 1A-1B depict a system for modifying screen content based on gaze tracking and user distance from the screen, according to various embodiments.

FIG. 1A illustrates a system 100 for modifying screen content based on gaze tracking and user distance from the screen, according to one embodiment. The system 100 includes a screen 101 of a computing device (not pictured). The screen 101 may be integrated into the computing device (e.g., a laptop, smartphone, tablet, and the like), or may be a separate component communicably coupled to the computing device (e.g., a standalone monitor connected to a desktop computer). As shown, a gaze module 120 may be configured to detect the focus of the gaze of a user 102 viewing the screen 101. The gaze module 120 may generally be implemented as any combination of hardware and software capable of determining the focus of a user's eyes. For example, the gaze module 120 may be implemented using cameras, lasers, or any optical scanning technology. In one embodiment, the gaze module 120 includes sensors that calculate the angle of refraction of ultraviolet (UV) or infrared (IR) light off of a user's eyes. The gaze module 120 may then consider the angle of refraction to determine a corresponding portion of the screen 101 where the user's gaze is focused. In another embodiment, the gaze module 120 may analyze captured images to determine where the user is looking at (based, for example, on an expected location of the user's iris).

The gaze module 120 may further be configured to determine the distance 104 from the user 102 to the screen 101. In at least one embodiment, the gaze module 120 may determine the user's distance from the screen based on the distance between a point of each eye (e.g., the iris of each eye). For example, as the user moves further from the screen 101, the apparent distance (as measured from the perspective of the screen) between a center point of each iris decreases. Generally, therefore, the gaze module 120 may compute the distance to the screen based on the distance between each point of the eye. In other embodiments, the gaze module 120 may use, for example, lasers, cameras, IR waves, radar, and the like to determine the distance 104 of the user from the screen 101. The distance 104 may be relative to the gaze module 120 (e.g., when the gaze module 120 is disposed on the screen 101). In another embodiment, the distance 104 is relative to a point of the screen 101, such as a predefined corner, a center point of the screen 101, and the like.

During an initial calibration process, the system 100 may determine a user's level of vision, and define scaling (or zoom) factors, text sizes, and other user preferences (generally referred to herein as modification settings) that facilitate the user's ability to clearly read content presented on the screen 101. For example, the system 100 may ask the user 102 to stand at different distances from the screen 101, and present content of different sizes. The user 102 may then provide feedback indicating whether the content is readable at each of the distances and/or sizes. The system 100 may also calibrate based on other factors, such as ambient lighting, the brightness or intensity of the screen 101, and the like. Based on the calibration process, the system 100 may then determine optimal text sizes and/or scaling factors for the user. In at least one embodiment, the system 100 may define a function that considers the user's distance to the screen and the user's level of vision, to produce a value that modifies text, images, videos or any type of content, such that the content is readable to the user.

As shown in FIG. 1A, the gaze module 120 has determined a distance 104 of the user, and determined that the gaze 110 of the user is focused on content box 103 of the screen 101. Based on the distance 104 and a size of the text in the content box 103, the system 100 may determine that the content is not readable by the user 102. Advantageously, however, the system 100 may modify the content box 103 based on the user's distance to the screen and the modification settings associated with the user 102.

Figure 1B:
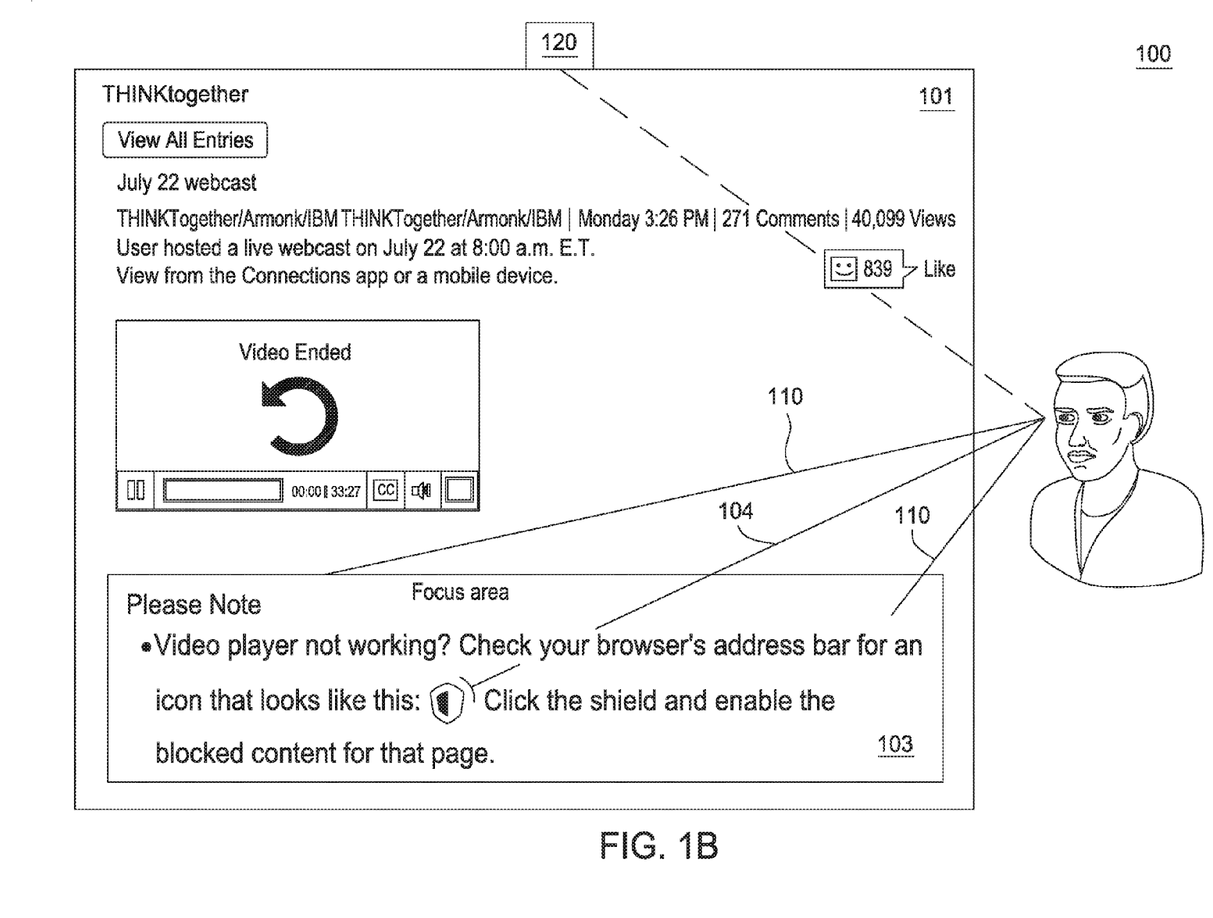

FIG. 1B illustrates a modification of the content box 103 based on the distance 104 between the user and the screen 101, according to one embodiment. As shown, the size of the content box 103 (and the text therein) has been enlarged, or magnified, based on the distance 104 between the user 102 and the screen 101. Advantageously, however, the remainder of the content presented on the screen 101 has not been modified, preserving the overall structure of the content. Although not pictured, the system 100 may provide any type of modification to make content more easily readable by users, such as highlighting, changing fonts to more readable fonts, enlarging images and/or video, and the like.

Further still, if the gaze module 120 determines that the user's gaze 110 has shifted away from the content box 103, the system 100 may roll back any modifications made to the content box 103, returning the content box 103 to its original size. The gaze module 110 may then determine what part of the screen 101 is the focus of the user's gaze, and modify that portion of the screen according to the user's distance from the screen, and the user-specific calibration data.

Figure 2:
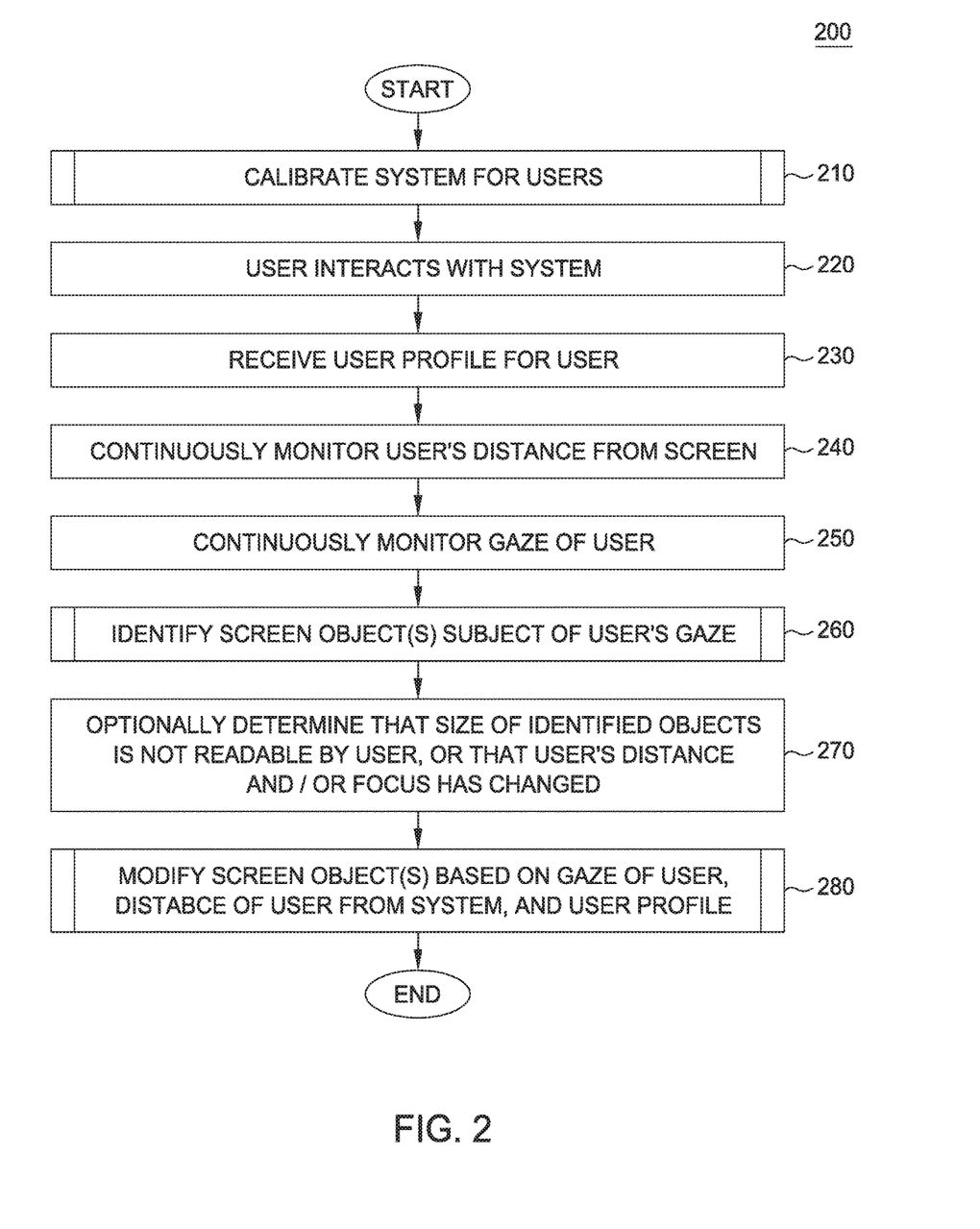
FIG. 2 is a flow chart illustrating a method for modifying screen content based on gaze tracking and user distance from the screen, according to one embodiment.

FIG. 2 is a flow chart illustrating a method 200 for modifying screen content based on gaze tracking and user distance from the screen, according to one embodiment. As shown, the method 200 begins at block 210, where the eye-tracking system disclosed herein is calibrated for one or more users. The calibration process is described in greater detail with reference to FIG. 3. Generally, the calibration process allows the system to determine optimal, distance-based content modification values that are specific to each user's level of vision. For example, for a first user, the calibration process may define a zoom factor of 150% when the user is 30 centimeters from the screen, with a 10% decrease in the zoom factor for each 6 cm decrease in the user's distance from the screen. Therefore, if the user is 30 cm from the screen, the system may determine the focus of the user's gaze, and magnify an image by 150%, or increase the font size of text by 150%. In some embodiments, the scaling is not performed on a linear basis. For example, the scaling could be done on an exponential or logarithmic scale.]

At block 220, a user may subsequently interact with the system. The user may be identified based on an account associated with the computing system, a login/password combination, or any other method. At block 230, the system may receive a user profile for the user, where the user profile includes calibration settings as well as user-defined custom settings. Examples of user-defined settings include a maximum and/or minimum magnification width or length, scaling factors, and/or font sizes. At block 240, the system may continuously monitor the user's distance from the screen. The system may monitor the distance at predefined timing intervals, such as once per second, ten seconds, and the like. As previously indicated, the system may use any type of method to determine the user's distance from the screen. At block 250, the system may continuously monitor the focus of the user's gaze, and determine a corresponding area or point on the screen that is being viewed by the user. At block 260, described in greater detail with reference to FIG. 4, the system may identify one or more screen objects that are the subject of the user's gaze. For example, the system may identify structured elements in a webpage that correspond to the area of the screen the user is watching. Similarly, the system may draw geometric shape (e.g., a circle, square, or rectangle) around a focal point on the screen, and identify any objects within that shape as being subject of the user's gaze.

At block 270, the system may optionally determine that the identified screen objects (e.g., text, images, and video) are not viewable by the user. For example, the system may identify text that is in a size 10 font (or a font style not easily read by the user), while the user's profile specifies that the user cannot read fonts smaller than size 14 point. The system may further optionally determine that the user's distance to the screen has changed, or the user's gaze has changed. In response, at block 280, described in greater detail with reference to FIG. 5, the system may modify the identified screen objects based on the user's gaze, the user's distance from the screen, and the settings in the user's profile. For example, the system may increase the font size of text, apply a scaling factor to zoom in on an image, highlight text, and the like.

Figure 3:
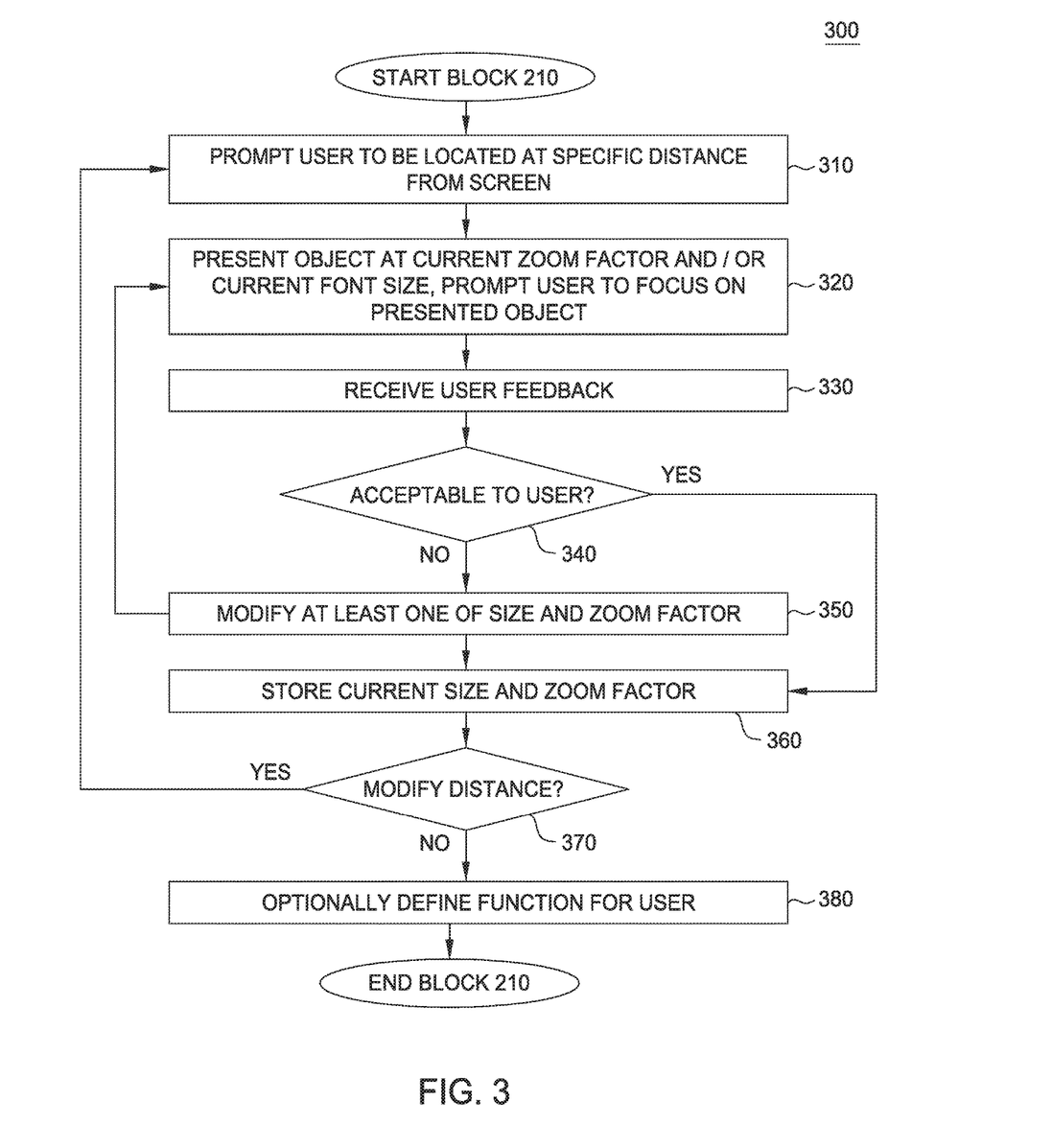
FIG. 3 is a flow chart illustrating a method to calibrate a system, according to one embodiment.

FIG. 3 is a flow chart illustrating a method 300 corresponding to block 210 to calibrate a system, according to one embodiment. Generally, the steps of the method 300 provide techniques to determine the level of assistance a user may need in viewing on-screen content based on their specific levels of vision, and define scaling factors, font sizes, and other assistance parameters to enhance the user's experience by making on-screen content more visible to these users. As shown, the method 300 begins at block 310, where the calibration system may prompt the user to locate themselves at a specified distance from the computer screen (e.g., 1 meter, 0.5 meters, and the like). At block 320, the system may present an object on the screen. For text objects, the text may be at a current font size (e.g., 12 point font). For all objects, the objects may be presented at a current zoom factor (e.g., 100% of the original size of the object). The system may then request the user to focus on the object. Doing so may allow the system to train itself on where the user's gaze is focused when looking at this point of the screen.

At block 330, the system may receive user feedback indicating whether the content was readable (or otherwise clearly viewable) to the user. The user may specify, for example, that text or images are too small, too large, or the right size. At block 340, the system determines whether the feedback indicates the objects displayed at block 320 are acceptable to the user. If the objects are not acceptable to the user (e.g., the user cannot clearly view the objects), the method proceeds to block 350, where the system may modify at least one of the size of the object and the zoom factor applied to the object. For example, if the font is too small, the system may increase the font size of the text. If an image is too large, the system may decrease a zoom factor applied to the image. The method may then return to block 320 to present the modified object to the user, and determine whether the modified object is acceptable.

Returning to block 340, if the object is acceptable to the user, the method proceeds to block 360. At block 360, the system may store the current size and zoom factor associated with the user's current distance from the screen. At block 370, the system may determine whether to prompt the user to modify their distance from the screen. For example, the system may need to collect data points from a predefined number of user-to-screen distances. If more data points are needed, the system returns to block 310, where the user is asked to change their distance from the screen in another iteration of the calibration process. If the user has viewed content from enough distances, the method proceeds to block 380, where the system may optionally define a function for the user based on the data points stored at each iteration of block 360. For example, the system may define a font size for each distance at block 360. The system may then define a function which produces a font size specific to the user, based on the user's distance to the screen. Similarly, the function may output a zoom factor specific to the user, and again based on the user's distance to the screen.

Figure 4:
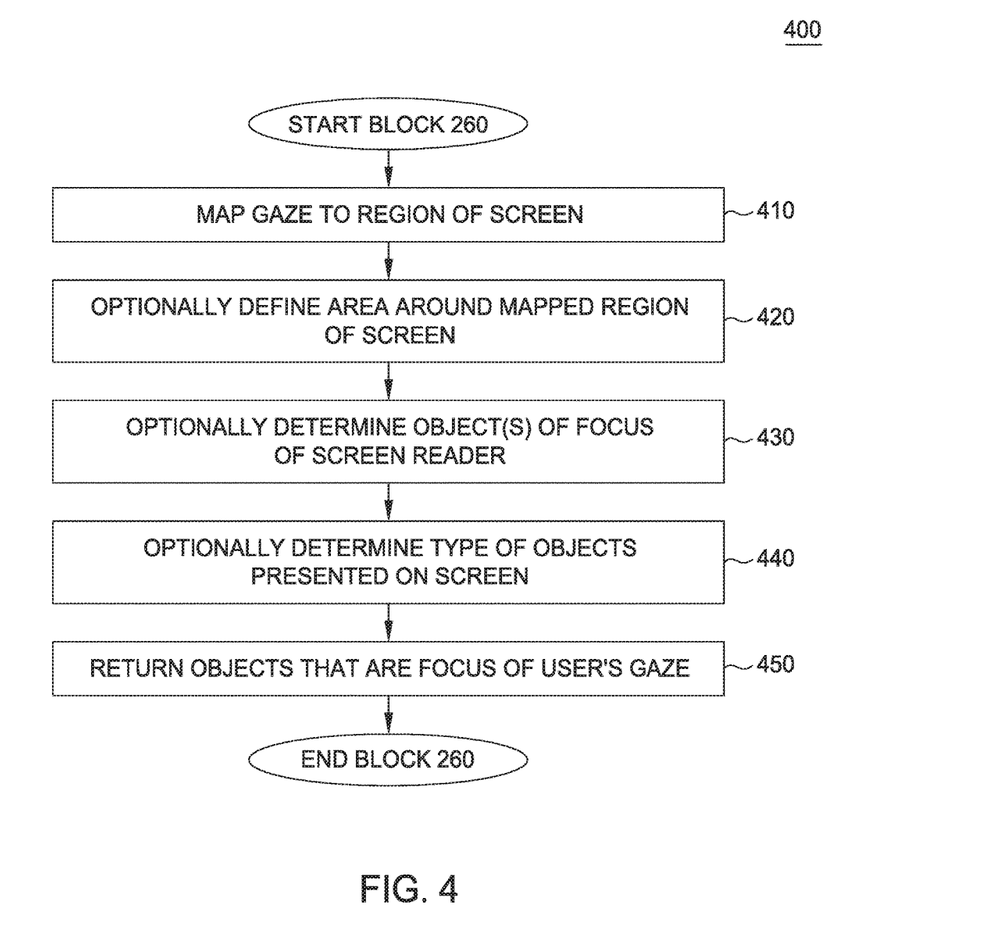
FIG. 4 is a flow chart illustrating a method to identify screen objects that are the subject of a user's gaze, according to one embodiment.

FIG. 4 is a flow chart illustrating a method 400 corresponding to block 260 to identify screen objects that are the subject of a user's gaze, according to one embodiment. As shown, the method 400 begins at block 410, where the system may leverage information provided by the gaze module 120 to map the user's gaze to a region of the screen. For example, the system may use an angle of refraction from the user's eyes to determine where the user's gaze is focused. Similarly, the gaze module 120 may capture an image of the user's eyes, and analyze the image data to determine where the user's eyes are focused. Based on this data, the system may map the user's gaze to a predefined area of the screen. At block 420, the system may optionally define an area around the region of the screen identified at block 410. For example, the system may define a square of 3 cm around a point of the screen identified at block 410. At block 430, the system may optionally determine an object that is the focus of a screen reader component of an operating system. Generally, screen readers may "speak" the content presented on a screen to users who have hearing disabilities. If the screen reader is reading a certain portion of text, and the user's gaze is generally in this area of the screen, the system may determine that the associated objects are subject of the user's gaze.

At block 440, the system may optionally determine the types of objects that are presented on screen. For example, there may be images, text, video, and any other type of content on the screen. However, structured elements that are near the area of the screen identified at block 410 may be associated with the user's gaze, even if they fall outside of the predefined area at block 420, for example. Therefore, an entire HTML frame may be associated with the user's gaze, even if the size of the frame is greater than the example 3 cm area defined above. Similarly, each of the images in a tile of images that totals 4 cm×4 cm may be identified as the objects that are subject of the user's focus or gaze. At block 450, the system may return the objects that are determined to be the subject of the user's gaze.

Figure 5:
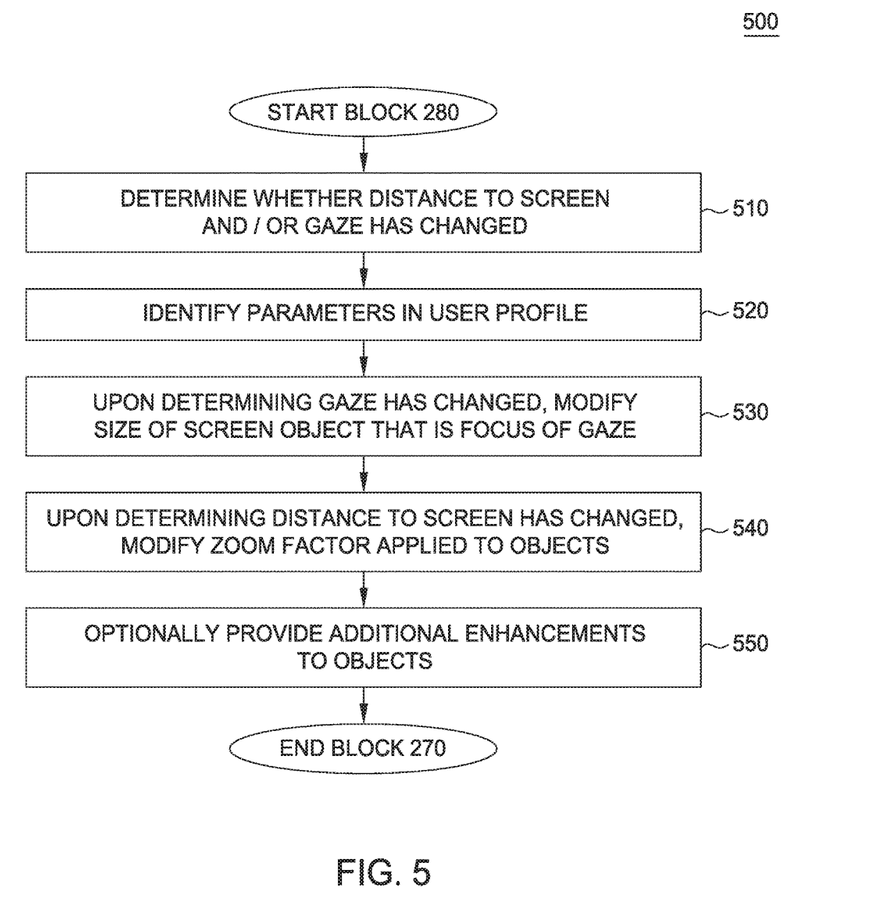
FIG. 5 is a flow chart illustrating a method to modify screen objects based on a gaze of the user, a distance of the user from the screen and a user profile, according to one embodiment.

FIG. 5 is a flow chart illustrating a method 500 corresponding to block 280 to modify screen objects based on a gaze of the user, a distance of the user from the screen and a user profile, according to one embodiment. As shown, the method 500 begins at block 510, where the system determines whether the user's distance to the screen has changed or whether the subject of the user's gaze has changed. Doing so allows the system to identify the appropriate parameters stored in the user profile at block 520. For example, the system may identify zoom factors, font sizes, and the like, which correspond to the user's current distance from the screen, the type of content subject of the user's gaze, and the like. At block 530, the system may modify the size of a screen object upon determining that the user's gaze has changed. For example, if the user is looking at a block of text, and the text is too large for the user to clearly read, the system may decrease the size of the text (or convert the text to a different, more readable, font). The size modification may be based on the relevant parameters stored in the user's profile. At block 540, the system may, upon determining that the user's distance to the screen has changed, modify the zoom factor applied to the on-screen objects. For example, if the user has moved away from the screen, and an image is too small to read based on this distance (and the user's profile data), the system may increase a zoom of the image, thereby making the image appear larger on the screen. At block 550, the system may optionally provide additional enhancements to objects viewed by the user. For example, the system may highlight text, draw boxes around images, and the like.

Figure 6:
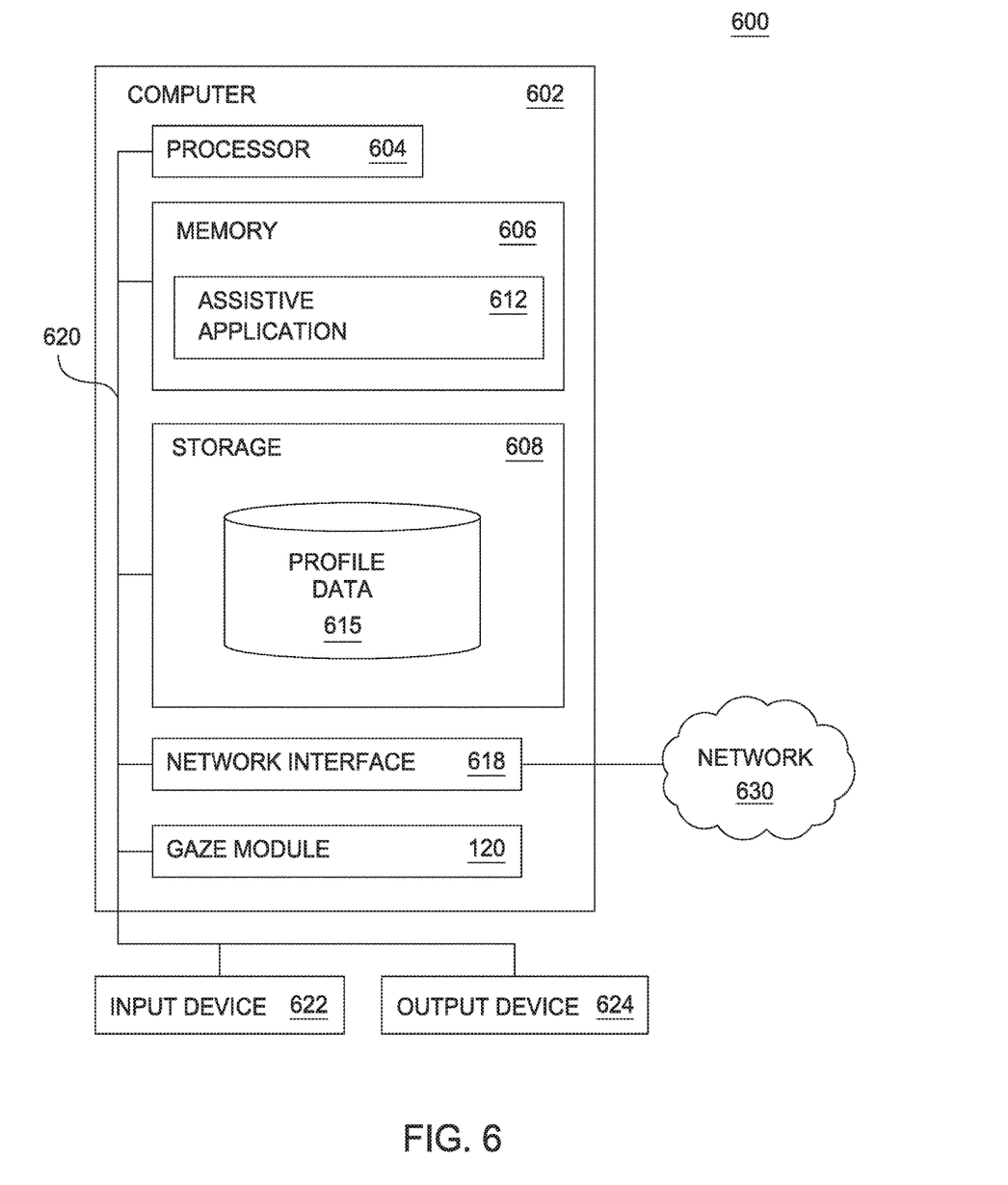
FIG. 6 is a block diagram illustrating a system which modifies screen content based on gaze tracking and user distance from the screen, according to one embodiment.

FIG. 6 is a block diagram illustrating a system 600 which modifies screen content based on gaze tracking and user distance from the screen, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. As shown, the computer 602 also includes a gaze module 120. The gaze module 120 may be an integrated component of the computer 602, or may be an external component communicably coupled to the computer via the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the assistive application 612, which is configured to modify on-screen content based on a user's distance to a computer screen and a focus of the user's gaze. Generally, the assistive application 612 may perform all functionality described above with reference to FIGS. 1-5. For example, the assistive application 612 may perform a calibration process for each of a plurality of users, and store user-specific vision information, including zoom factors, font sizes, and the like, in the profile data 115. When the user subsequently views content on a screen (e.g., the output device 624), the assistive application 612 may determine the user's distance from the screen using data received from the gaze module 120. The assistive application 612 may further determine a focus of the user's gaze using data received from the gaze module 120, and identify a corresponding set of objects on the screen that are subject of the user's gaze. The assistive application 612 may then reference the profile data 615 to modify the objects on the screen such that the user can view them more easily.

As shown, the storage 608 contains the profile data 615. The profile data 615 stores user-specific profile data, such as vision levels, preferred font sizes, user preferences, distance-based functions for scaling/zooming of content, and the like. Generally, the system 600 is configured to implement all apparatuses, methods, and functionality described above with reference to FIGS. 1-5.

Advantageously, embodiments disclosed herein provide techniques to assist users with limited or no vision. By modifying on-screen content based on the user's profile, distance to the screen, and focus of the user's gaze, the user is more likely to be able to read or otherwise view objects presented on the screen. Doing so improves the field of assistive applications for users with vision disabilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the assistive application 612 could execute on a computing system in the cloud and perform the vision calibration process for a plurality of users. In such a case, the assistive application 612 could compute user profile data for each user and store the profile data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   determining a distance of a user from a screen displaying a plurality of objects;
   monitoring, by a gaze module, a gaze of the user;
   determining a focal point of the gaze of the user relative to the screen;
   identifying a first object within the focal point of the gaze of the user, wherein the identification of the first object includes an object type and object properties;
   determining that the first object is not viewable by the user based on comparing user settings in a user profile to the object type and object properties, wherein the user settings specify one or more object types and one or more object properties that are not viewable by the user; and
   modifying, based on the distance, the focal point, and the user settings, one or more attributes of the first object, wherein the one or more attributes comprise at least one of a size of the first object and a zoom factor applied to the first object.

2. The method of claim 1, further comprising:
   determining, by the gaze module, that the focal point of the gaze of the user has changed;
   determining that a second object, of the plurality of objects, corresponds to the changed focal point of the gaze of the user;
   modifying the first object to return the first object to an unmodified state based on the changed focal point of the gaze of the user; and
   modifying, based on the distance and the changed focal point, at least one of a size of the second object and a zoom factor applied to the second object.

3. The method of claim 1, further comprising:
   determining that the distance of the user from the screen has increased; and
   increasing at least one of the size of the first object and the zoom factor applied to the first object based on the increased distance from the screen.

4. The method of claim 1, further comprising generating a profile for the user by:
   prompting the user to stand a predefined distance from the screen;
   determining that the user is standing at the predefined distance from the screen;
   displaying the first object on the screen;
   receiving user feedback describing whether the user can view the first object;
   upon determining that the user feedback specifies that the user can view the first object, storing an indication of a current size and a current zoom factor applied to the first object in the profile for the user; and
   upon determining that the user feedback specifies that the user cannot view the first object:
      increasing at least one of the current size of the first object and the current zoom factor applied to the first object, thereby enlarging the first object;
      receiving user feedback indicating the user can view the enlarged first object; and
      storing an indication of the current size and the current zoom factor of the enlarged first object in the profile for the user.

5. The method of claim 4, wherein modifying one or more attributes of the first object is further based on user attributes stored in the profile for the user.

6. The method of claim 1, wherein modifying one or more attributes of the first object comprises at least one of: (i) increasing the size of the first object, (ii) increasing the zoom factor applied to the first object, (iii) decreasing the size of the first object, and (iv) decreasing the zoom factor applied to the first object.

7. The method of claim 1, further comprising:
   determining that the first object is of a first type of object, of a plurality of types of objects, wherein modifying one or more attributes of the first object is further based on determining that the first object is of the first type.

8. A system, comprising:
   a processor; and
   a memory containing a program which when executed by the processor performs an operation comprising:
      determining a distance of a user from a screen displaying a plurality of objects;
      monitoring, by a gaze module, a gaze of the user;
      determining a focal point of the gaze of the user relative to the screen;
      identifying a first object within the focal point of the gaze of the user, wherein the identification of the first object includes an object type and object properties;
      determining that the first object is not viewable by the user based on comparing user settings in a user profile to the object type and object properties, wherein the user settings specify one or more object types and one or more object properties that are not viewable by the user; and
      modifying, based on the distance, the focal point, and the user settings, one or more attributes of the first object, wherein the one or more attributes comprise at least one of a size of the first object and a zoom factor applied to the first object.

9. The system of claim 8, the operation further comprising:
   determining, by the gaze module, that the focal point of the gaze of the user has changed;
   determining that a second object, of the plurality of objects, corresponds to the changed focal point of the gaze of the user;
   modifying the first object to return the first object to an unmodified state based on the changed focal point of the gaze of the user; and
   modifying, based on the distance and the changed focal point, at least one of a size of the second object and a zoom factor applied to the second object.

10. The system of claim 8, the operation further comprising:
    determining that the distance of the user from the screen has increased; and
    increasing at least one of the size of the first object and the zoom factor applied to the first object based on the increased distance from the screen.

11. The system of claim 8, the operation further comprising generating a profile for the user by:
    prompting the user to stand a predefined distance from the screen;
    determining that the user is standing at the predefined distance from the screen;
    displaying the first object on the screen;
    receiving user feedback describing whether the user can view the first object;

upon determining that the user feedback specifies that the user can view the first object, storing an indication of a current size and a current zoom factor applied to the first object in the profile for the user; and upon determining that the user feedback specifies that the user cannot view the first object:

increasing at least one of the current size of the first object and the current zoom factor applied to the first object, thereby enlarging the first object;

receiving user feedback indicating the user can view the enlarged first object; and storing an indication of the current size and the current zoom factor of the enlarged first object in the profile for the user.

12. The system of claim 11, wherein modifying one or more attributes of the first object is further based on user attributes stored in the profile for the user.

13. The system of claim 8, wherein modifying one or more attributes of the first object comprises at least one of: (i) increasing the size of the first object, (ii) increasing the zoom factor applied to the first object, (iii) decreasing the size of the first object, and (iv) decreasing the zoom factor applied to the first object.

14. The system of claim 9, the operation further comprising:

determining that the first object is of a first type of object, of a plurality of types of objects, wherein modifying one or more attributes of the first object is further based on determining that the first object is of the first type.

15. A computer program product, comprising:

a non-transitory computer-readable storage medium having computer-readable program code embodied therewith, the computer-readable program code executable by one or more computer processors to perform an operation comprising:

determining a distance of a user from a screen displaying a plurality of objects;

monitoring, by a gaze module, a gaze of the user;

determining a focal point of the gaze of the user relative to the screen;

identifying a first object within the focal point of the gaze of the user, wherein the identification of the first object includes an object type and object properties;

determining that the first object is not viewable by the user based on comparing user settings in a user profile to the object type and object properties, wherein the user settings specify one or more object types and one or more object properties that are not viewable by the user; and modifying, based on the distance, the focal point, and the user settings, one or more attributes of the first object, wherein the one or more attributes comprise at least one of a size of the first object and a zoom factor applied to the first object.

16. The computer program product of claim 15, the operation further comprising:

determining, by the gaze module, that the focal point of the gaze of the user has changed;

determining that a second object, of the plurality of objects, corresponds to the changed focal point of the gaze of the user;

modifying the first object to return the first object to an unmodified state based on the changed focal point of the gaze of the user; and modifying, based on the distance and the changed focal point, at least one of a size of the second object and a zoom factor applied to the second object.

17. The computer program product of claim 15, the operation further comprising:

determining that the distance of the user from the screen has increased; and increasing at least one of the size of the first object and the zoom factor applied to the first object based on the increased distance from the screen.

18. The computer program product of claim 15, the operation further comprising generating a profile for the user by:

prompting the user to stand a predefined distance from the screen;

determining that the user is standing at the predefined distance from the screen;

displaying the first object on the screen;

receiving user feedback describing whether the user can view the first object;

upon determining that the user feedback specifies that the user can view the first object, storing an indication of a current size and a current zoom factor applied to the first object in the profile for the user; and upon determining that the user feedback specifies that the user cannot view the first object:

increasing at least one of the current size of the first object and the current zoom factor applied to the first object, thereby enlarging the first object;

receiving user feedback indicating the user can view the enlarged first object; and storing an indication of the current size and the current zoom factor of the enlarged first object in the profile for the user.

19. The computer program product of claim 18, wherein modifying one or more attributes of the first object is further based on user attributes stored in the profile for the user.

20. The computer program product of claim 15, wherein modifying one or more attributes of the first object comprises at least one of: (i) increasing the size of the first object, (ii) increasing the zoom factor applied to the first object, (iii) decreasing the size of the first object, and (iv) decreasing the zoom factor applied to the first object, wherein the operation further comprises:

determining that the first object is of a first type of object, of a plurality of types of objects, wherein modifying one or more attributes of the first object is further based on determining that the first object is of the first type.

* * * * *